United States Patent
Bachrach

(10) Patent No.: US 7,640,071 B2
(45) Date of Patent: *Dec. 29, 2009

(54) METHOD OF ACHIEVING HIGH PRODUCTIVITY FAULT TOLERANT PHOTOVOLTAIC FACTORY WITH BATCH ARRAY TRANSFER ROBOTS

(75) Inventor: Robert Z. Bachrach, Burlingame, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/212,522

(22) Filed: Sep. 17, 2008

(65) Prior Publication Data

US 2009/0012643 A1    Jan. 8, 2009

Related U.S. Application Data

(63) Continuation of application No. 11/747,583, filed on May 11, 2007, now Pat. No. 7,496,423.

(51) Int. Cl.
*G06F 19/00* (2006.01)

(52) U.S. Cl. .................. 700/112; 700/121; 700/213; 414/217; 414/277

(58) Field of Classification Search .............. 414/217, 414/277; 700/100, 112, 121, 213
See application file for complete search history.

(56) References Cited

U.S. PATENT DOCUMENTS

| | | | |
|---|---|---|---|
| 4,237,598 A * | 12/1980 | Williamson | 483/4 |
| 4,668,365 A | 5/1987 | Foster et al. | |
| 4,875,327 A | 10/1989 | Wilde | |
| 5,046,909 A | 9/1991 | Murdoch | |
| 5,174,707 A | 12/1992 | Suekane et al. | |
| 5,183,370 A | 2/1993 | Cruz | |
| 5,223,112 A | 6/1993 | Tepman | |
| 5,462,080 A | 10/1995 | Plavidal et al. | |
| 5,525,024 A | 6/1996 | Freerks et al. | |
| 5,789,878 A | 8/1998 | Kroeker et al. | |

(Continued)

OTHER PUBLICATIONS

International Search Report and Written Opinion dated Nov. 7, 2008 for International Application No. PCT/US 08/63266.

(Continued)

*Primary Examiner*—Albert Decady
*Assistant Examiner*—Douglas S Lee
(74) *Attorney, Agent, or Firm*—Patterson & Sheridan, LLP

(57) ABSTRACT

The present invention generally comprises a method for achieving fault tolerance in a PV FAB. A plurality of processing tools may be coupled together along a processing line, and a plurality of substantially identical processing lines may be arranged within the FAB. Whenever a processing tool within any processing line is shut-down, rather than shut-down the entire processing line containing the shut-down processing tool, work-pieces may be routed around the shut-down processing tool by transferring the work-pieces to an adjacent processing line within the FAB. At a location after the shut-down processing tool, the work-pieces may be transferred back to the processing line containing the shut-down processing tool. During the time period that the processing tool is shut-down, the other processing lines within the FAB may increase their throughput in order to maintain a substantially constant optimum throughput for the FAB over a given period of time.

20 Claims, 12 Drawing Sheets

U.S. PATENT DOCUMENTS

| | | | |
|---|---|---|---|
| 5,810,549 | A | 9/1998 | Wytman |
| 5,882,165 | A | 3/1999 | Maydan et al. |
| 5,957,648 | A * | 9/1999 | Bachrach ............... 414/217 |
| 5,993,141 | A | 11/1999 | Wytman |
| 6,016,611 | A | 1/2000 | White et al. |
| 6,053,687 | A | 4/2000 | Kirkpatrick et al. |
| 6,079,693 | A | 6/2000 | Ettinger et al. |
| 6,086,362 | A | 7/2000 | White et al. |
| 6,103,055 | A | 8/2000 | Maher et al. |
| 6,132,165 | A | 10/2000 | Carducci |
| 6,134,482 | A * | 10/2000 | Iwasaki ................. 700/121 |
| 6,149,365 | A | 11/2000 | White et al. |
| 6,176,668 | B1 | 1/2001 | Kurita et al. |
| 6,182,603 | B1 | 2/2001 | Shang et al. |
| 6,193,507 | B1 | 2/2001 | White et al. |
| 6,206,176 | B1 | 3/2001 | Blonigan et al. |
| 6,213,704 | B1 | 4/2001 | White et al. |
| 6,215,897 | B1 | 4/2001 | Beer et al. |
| 6,235,634 | B1 | 5/2001 | White et al. |
| 6,267,851 | B1 | 7/2001 | Hosokawa |
| 6,280,134 | B1 | 8/2001 | Nering |
| 6,286,230 | B1 | 9/2001 | White et al. |
| 6,287,386 | B1 | 9/2001 | Perlov et al. |
| 6,298,685 | B1 | 10/2001 | Tepman |
| 6,308,932 | B1 | 10/2001 | Ettinger et al. |
| 6,338,161 | B1 | 1/2002 | Ali Muhammad |
| 6,359,250 | B1 | 3/2002 | Blonigan et al. |
| 6,371,712 | B1 | 4/2002 | White et al. |
| 6,406,359 | B1 | 6/2002 | Birang et al. |
| 6,435,868 | B2 | 8/2002 | White et al. |
| 6,460,369 | B2 | 10/2002 | Hosokawa |
| 6,471,459 | B2 | 10/2002 | Blonigan et al. |
| 6,477,980 | B1 | 11/2002 | White et al. |
| 6,506,693 | B2 | 1/2003 | Heyder et al. |
| 6,517,048 | B2 | 2/2003 | Ettinger et al. |
| 6,517,303 | B1 | 2/2003 | White et al. |
| 6,520,839 | B1 | 2/2003 | Gonzalez-Martin et al. |
| 6,540,466 | B2 | 4/2003 | Bachrach |
| 6,552,297 | B2 | 4/2003 | Blonigan et al. |
| 6,572,321 | B1 | 6/2003 | Nulman |
| 6,647,993 | B2 | 11/2003 | Shang et al. |
| 6,679,671 | B2 | 1/2004 | Blonigan et al. |
| 6,679,755 | B1 | 1/2004 | Sommer et al. |
| 6,698,991 | B1 * | 3/2004 | Bachrach et al. ........... 414/217 |
| 6,719,516 | B2 | 4/2004 | Kroeker |
| 6,746,198 | B2 | 6/2004 | White et al. |
| 6,841,728 | B2 | 1/2005 | Jones et al. |
| 6,847,730 | B1 | 1/2005 | Beer et al. |
| 6,955,197 | B2 | 10/2005 | Elliott et al. |
| 7,076,326 | B2 * | 7/2006 | Wu et al. ................. 700/213 |
| 2001/0015074 | A1 | 8/2001 | Hosokawa |
| 2001/0024609 | A1 | 9/2001 | White et al. |
| 2001/0041122 | A1 | 11/2001 | Kroeker |
| 2002/0031420 | A1 | 3/2002 | Kroeker |
| 2002/0050581 | A1 | 5/2002 | Ettinger et al. |
| 2002/0090282 | A1 | 7/2002 | Bachrach |
| 2002/0096114 | A1 | 7/2002 | Carducci et al. |
| 2002/0187024 | A1 | 12/2002 | Nulman |
| 2003/0021658 | A1 | 1/2003 | Blonigan et al. |
| 2003/0113190 | A1 | 6/2003 | Bachrach |
| 2003/0141820 | A1 | 7/2003 | White et al. |
| 2003/0202868 | A1 | 10/2003 | Bachrach |
| 2004/0062633 | A1 | 4/2004 | Rice et al. |
| 2004/0065255 | A1 | 4/2004 | Yang et al. |
| 2004/0076496 | A1 | 4/2004 | Elliott et al. |
| 2004/0081545 | A1 | 4/2004 | Elliott et al. |
| 2004/0081546 | A1 | 4/2004 | Elliott et al. |
| 2004/0191030 | A1 | 9/2004 | Rice et al. |
| 2005/0005808 | A1 | 1/2005 | Wakabayashi et al. |
| 2005/0081785 | A1 | 4/2005 | Lubomirsky et al. |
| 2005/0121293 | A1 | 6/2005 | Rice et al. |
| 2005/0145464 | A1 | 7/2005 | Rice et al. |
| 2005/0186063 | A1 | 8/2005 | Rice et al. |
| 2005/0209721 | A1 | 9/2005 | Teferra et al. |
| 2005/0224315 | A1 | 10/2005 | Rice et al. |
| 2005/0260345 | A1 | 11/2005 | Lubomirsky et al. |
| 2007/0073430 | A1 | 3/2007 | Govind et al. |
| 2007/0148336 | A1 | 6/2007 | Bachrach et al. |
| 2007/0158654 | A1 | 7/2007 | Kholodenko et al. |
| 2007/0219660 | A1 * | 9/2007 | Kaneko et al. ............. 700/100 |

OTHER PUBLICATIONS

"An Introduction to Photovoltaics," Solar Integrated Technologies.

"GCEP Solar Energy Workshop," Stanford University—Global Climate and Energy Project, Oct. 18-19, 2004, pp. 1-558, http://gcep.stanford.edu/events/solar-workshops_10_04.html.

"Overview of "PV Roadmap Toward 2030" (PV 2030)", New Energy and Industrial Technology Development Organization (NEDO), New Energy Technology Development Department, Jun. 2004, http://www.nedo.go.jp/english/archives/161027/pv2030roadmap.pdf.

"Photovoltaics: Energy for the New Millennium," the National Photovoltaics Program Plan, National Renewable Energy Laboratory (NREL1), Jan. 2000, http://www.xsunx.com/files/Photovoltaics,%20Energy%20 for%20the%20New%20Millenium.pdf.

"Solar Cell Manufacturers," Solarbuzz, Inc., 2004, http://www.solarbuzz.com/solarindex/CellManufacturers.html.

"Solar Cell Manufacturing Plants," Solarbuzz, Inc., 2004, http://www.solarbuzz.com/Plants.htm.

"Solar Cell Technologies," Solarbuzz, Inc., 2004, http://www.solarbuzz.corniTechnologies.htm.

"Solar Decathlon: Energy We Can Live With," NREL Review, 2003, pp. 446-510.

"Solar Electric Power—The U.S. Photovoltaic Industry Roadmap," United States Photovoltaics Industry, May 2001, pp. 1-31, http://www.sandia.gov/pv/docs/PDF/PV Road_Map.pdf.

"Solar PV industry Here comes the sun," Global Renewable Energy, Dresdner Kleinwort Wasserstein Research, Jun. 2001, pp. 1-65, http://mertschenk.de/Produkte/A-SolarPVIndustry210601.pdf.

Birkmire "Solar Electric Future: Linking Science, Engineering, Invention and Manufacturing," Institute of Energy Conversion, University of Delaware, University Center of Excellence for Photovoltaic Research and Education, Mar. 25, 2002, pp. 262-283.

Curtner "Single Crystal Photovoltaic Cells-From Sunlight to Electricity," Senior Thesis Paper, Physics Department Kenyon College, Mar. 26, 1999.

DeWachter "Photovoltaic (PV) Tutorial," Jul. 18, 2006, http://64.243.182.248/includes/pv%20tutorial.pdf.

Fairley "Solar-Cell Rollout," Technology Review, Jul./Aug. 2004, pp. 34-40.

Föll "Semiconductor I," http://www.tf.uni-kiel.de/matwis/amat/semi_en/index.html.

Green "Chapter 4: Crystalline Silicon Solar Cells," Apr. 24, 2001, pp. 1-49, http://www.worldscibooks.com/phy_etextbook/p139/p139_13chap4.pdf.

Green "Recent developments in photovoltaics," Solar Energy, vol. 76, No. 1, Jan. 2004 , pp. 3-8.

Hammon "Communities of Super-Efficient Homes with Integrated Solar Generation," Zero Energy Homes.

Homes, et al. "The Value of Solar to New Home Buyers," Oct. 19, 2004.

Hug "Fuel Cell Research and Development in Southern Germany: Institutes and Companies Forging Ahead into the Future," Solar-Report, Solarserver, Forum for Solar Energy, Oct. 15, 2001, http://www.solarserver.de/solarmagazin.artikeloktober2001-e.html.

Hug "New Photovoltaic Factories and Capacities in Germany," Solar-Report, The Solarserver, Forum for Solar Energy, Nov. 14, 2004, http://www.solarserver.de/solarmagazin/artikeloktober2002-e.html.

International Search Report and Written Opinion dated Aug. 27, 2008 for International Application No. PCT/US2008/063259.

International Search Report and Written Opinion dated Sep. 2, 2008 for International Application No. PCT/US2008/063264.

International Search Report and Written Opinion for International Application No. PCT/US2008/063261 dated Aug. 21, 2008.

Jeppesen "Photovoltaics and Building Construction," Environmental Design+Construction, Jun. 1, 2004, BNP Media, http://www.edcmag.com/CDA/ArticleInformation/features/BNP_Features_Item/0,4120,125946.00.html.

Junfeng, et al. "Chinas Renewable Energy Development Strategy," Center for Renewable Energy Development, Energy Research Institute, article courtesy of the EETIC, Renewable Energy Access, Dec. 3, 2004, http://renewableenergyaccess.com/rea/news/story?id=19483, pp. 1-3.

King "The DOE Solar Program: Photovoltaics," U.S. Department of Energy, Energy Efficiency and Renewable Energy, Mar. 24, 2003, pp. 104-118.

Mosher "Solar Cells".

Parra, et al. "Basic Science and modeling of Solar Energy," SCI 322U—Energy and Society II Presentation.

Rand, et al. "Silicon-Film™ Sheet, Solar Cell and Module Manufacturing," pp. 37-40.

Strong "WBDG: Building Integrated Photovoltaics (BIPV)," Whole Building Design Guide, National Institute of Building Sciences, 2004, http://www.wbdg.org/design/bipv.php.

Symko-Davies, et al. "Decade of PV Industry R&D Advances in Silicon Module Manufacturing," IEEE, 2000, pp. 1460-1463.

Tatro "An Energy Security, Systems Context for Solar Energy Technologies," Energy and Transportation Security Center, Sandia National Laboratories, pp. 2-10.

\* cited by examiner

METHOD OF ACHIEVING HIGH PRODUCTIVITY FAULT TOLERANT PHOTOVOLTAIC FACTORY WITH BATCH ARRAY TRANSFER ROBOTS

CROSS-REFERENCE TO RELATED APPLICATIONS

This application is a continuation of U.S. patent application Ser. No. 11/747,583, filed May 11, 2007 now U.S. Pat. No. 7,496,423, which is hereby incorporated by reference.

BACKGROUND OF THE INVENTION

1. Field of the Invention

Embodiments of the present invention generally describe achieving fault tolerance in an automated high productivity factory for batch array work-piece handling and processing sized for producing 1,000 or more work-pieces an hour and as high as 40,000 per hour or more. High volume factories require predictable production over some calendar period and require a method of fault tolerance.

2. Description of the Related Art

Solar energy from the sun may be converted to electricity by utilizing a solar power technology called photovoltaics (PV) that uses solar cells tiled into modules. Solar cells produce direct current electricity from the sun's rays, which can be used to power equipment, to recharge batteries, or be converted to AC for on-grid applications.

Increased productivity for manufacturing of PV cells and modules requires batch processing of multiple solar cell work-pieces simultaneously if supply is to meet customer demand. To produce the PV cells and modules, numerous processes may need to be performed upon a work-piece. The work-piece may thus need to be moved from one processing tool to another. A processing tool may comprise one or more chambers coupled together. For example, a processing tool that performs a vacuum based process may comprise one or more processing chambers and one or more load lock chambers coupled together. For a non-vacuum process such as metrology, the processing tool may comprise one or more metrology chambers.

FABs, sometimes referred to as factories, may be set up to arrange all of the necessary processing tools that are needed to process a work-piece into a single processing line. A work-piece exits the processing line after the necessary processes have occurred as a finished product. To increase the output of a FAB, numerous substantially identical processing lines may be present.

At any given point in time, it is not uncommon for a processing tool within a processing line to shut-down for repairs. When any processing tool is shut-down along a processing line, the processing line may shut-down and thus produce no product during the shut-down period. The shut-down thus affects the product output.

For example, suppose a processing tool has a mean time between failures (MTBF) of 320 hours, then a FAB having 50 tools will, on average, have 1 tool shut-down in any 8-hour period. Therefore, when a processing tool is shut-down for an 8-hour period, the processing line containing the shut-down tool is also shut-down for the 8-hour period and thus produces no product. Hence, the processing line has a fault. When a processing line produces no product, the total output of the FAB, as well as the average throughput over a specified period of time, will decrease. Fault tolerance is where a FAB would be able to compensate for a fault while maintaining the desired FAB throughput. It would be beneficial to overcome faults in FABs and still maintain a desired FAB throughput.

Therefore, there is a need in the art for achieving fault tolerance in a photovoltaic FAB.

SUMMARY OF THE INVENTION

The present invention generally comprises a method for achieving fault tolerance in a PV FAB which comprises equipment for an automated high volume work-piece manufacturing architecture consisting of work-piece handling and work-piece processing organized in a regular fashion from a group of lines comprising parallel channels. For descriptive purposes, factory architecture supports a river of work-pieces comprising streams (lines) which are further sub-divided into channels. Channels may operate in a continuous conveyor in some cases and in segmented piece-wise continuous batches in others. The batch array may be 1 or 2 dimensions, (i.e., 1×n or n×m work-pieces).

The work-pieces may be transported or presented to the equipment from a stacked orientation supply to a parallel orientation array of channels comprising a stream. Additionally, the work-pieces may be transferred between manufacturing architecture entities by an array to array batch transfer of channels. The work-pieces may be transferred within the manufacturing architecture in an array to array batch transfer operation as opposed to one work-piece at a time. The robotic operations on the streams of work-pieces may be between robotic devices, between robotic devices and processing equipment, and within processing equipment. In general, fault tolerance requires a factory operating policy which implements capability redundancy and reserves some capacity for managing production during equipment shutdown due to failure, repair or scheduled maintenance.

Whenever a processing tool within any processing line is shut-down, rather than shut-down the entire processing line containing the shut-down processing tool, work-piece flow channels may be routed around the shut-down processing tool by transferring the work-pieces to an adjacent processing line in the FAB if additional capacity is available.

In one embodiment, a method of achieving fault tolerance for a photovoltaic FAB is disclosed. The method comprises disposing a batch of work-pieces into a FAB, the FAB comprising a plurality of substantially identical processing lines, each processing line having a plurality of processing tools coupled together, the FAB further comprising one or more buffer or stocker stations between each processing line at a location adjacent to each processing tool, batch processing the work-pieces within the individual processing lines without transferring work-pieces between the processing lines, the batch processing occurring at a predetermined optimum throughput that is below a maximum throughput, detecting a shut-down at one or more processing tools in a first processing line of the plurality of substantially identical processing lines, batch array transferring a plurality of work-pieces between processing lines at the one or more buffer or stocker stations at a location before the shut-down tool of the first processing line, batch array receiving the plurality of transferred work-pieces into a second processing line, and increasing throughput for the second processing line to a level above the optimum level in order to achieve fault tolerance and maintain a substantially constant throughput averaged over a predetermined period of time.

In another embodiment, a method of achieving fault tolerance for a photovoltaic FAB is disclosed. The method comprises determining a minimum economic unit for a processing line within the FAB to achieve an optimum throughout in the FAB, the processing line having a plurality of processing tools coupled together, coupling a plurality of processing lines together within the FAB, each processing line having the minimum economic unit, the plurality of processing lines coupled together at one or more of the processing tools, detecting a shut-down of one or more tools within one or more processing lines, and compensating for the shut-down of the one or more tools to achieve fault tolerance. The compensating comprises batch array transferring work-pieces between the plurality of processing lines at a first buffer or stocker station disposed prior to the shut-down of the one or more tools adjacent processing lines, batch array transferring the work-pieces between the plurality of processing lines at a second buffer or stocker station disposed after the shut-down of the one or more tools, and increasing throughput through the plurality of processing lines above the optimum throughput such that the average throughput for the FAB over a predetermined period of time remains substantially constant.

In yet another embodiment, a photovoltaic FAB having fault tolerance capabilities is disclosed. The FAB comprises a plurality of substantially identical processing lines disposed within the FAB, each processing line comprising a plurality of processing tools, one or more buffer or stocker stations disposed between adjacent processing lines at locations between each processing tool, and one or more batch array work-piece transfer devices, the devices capable of retrieving a plurality of work-pieces into a processing tool, and rotating and extending to the one or more buffer or stocker stations disposed between processing lines.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A depicts line array and FIG. 3B depicts array parallel.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 8:
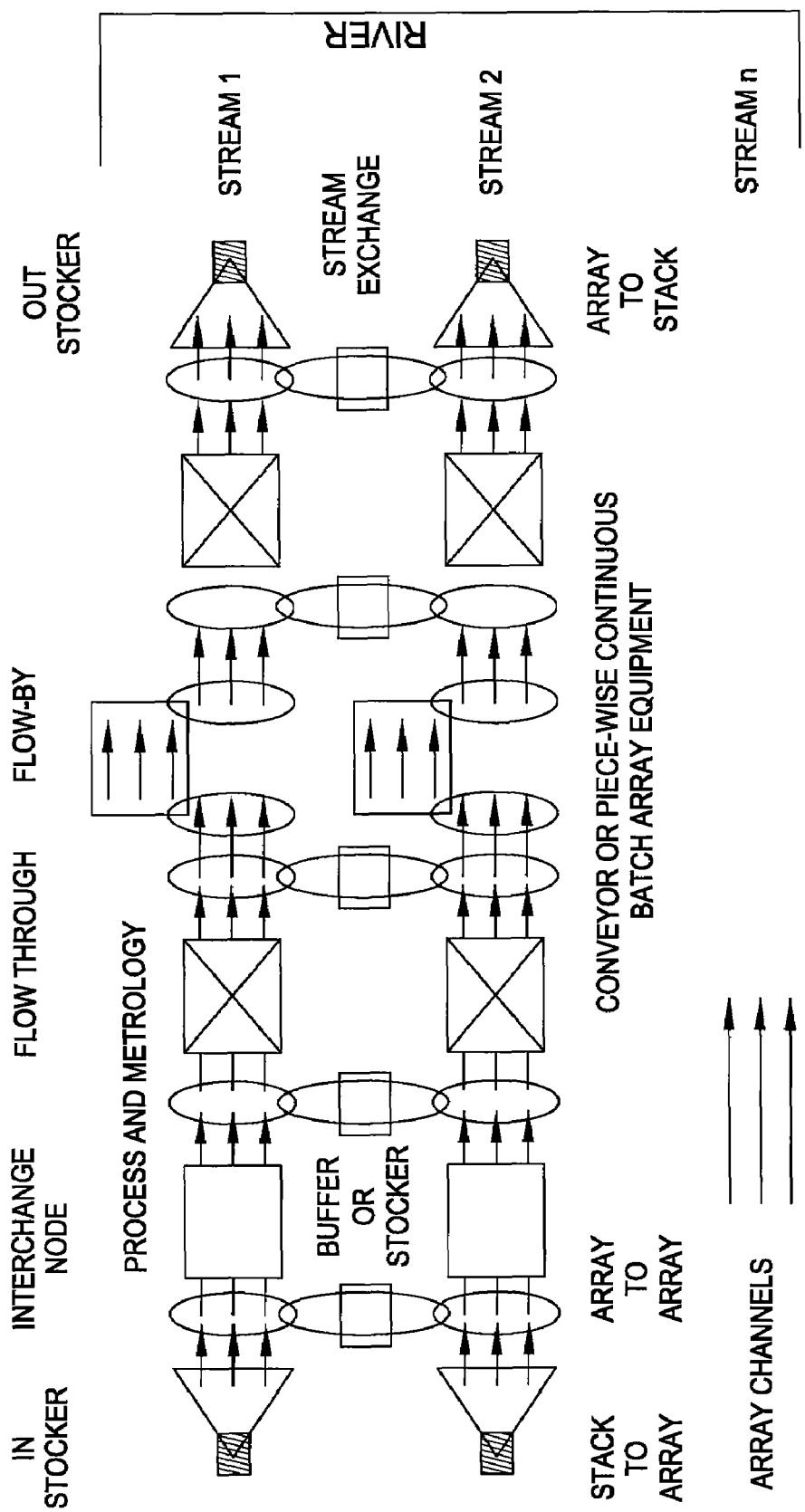
FIG. 8 is a schematic view of a FAB within which photovoltaic work-pieces may be processed.

The present invention generally comprises a method for achieving fault tolerance in a PV FAB. FIG. 8 shows a schematic view of a FAB within which photovoltaic work-pieces may be processed by introducing the work-pieces to a processing line. Processing lines may alternatively be referred to as streams. A plurality of identical processing lines within a FAB may be referred to as a river. The work-pieces may initially be stacked one on top of another, but transferred from the stacked arrangement to an array arrangement before introduction to the processing line. The individual arrays within the processing lines or streams, arranged adjacent to each other as shown by the arrows, may be referred to as array channels. A plurality of processing tools may be coupled together along a processing line, and a plurality of substantially identical processing lines may be arranged within the FAB.

The work-pieces may be transferred between processing tools along a processing line or stream by an array to array transfer whereby an array of work-pieces may be transferred from one processing tool to another processing tool as an array rather than individually transferring the work-pieces one at a time. The various processing tools may include one or more metrology tools. The processing tool may be arranged in a flow through manner whereby the processing tools are arranged in a linear fashion, a flow-by arrangement whereby the processing tools are arranged in a non-linear fashion, or a combination of flow through and flow-by arrangements.

Whenever a processing tool within any processing line is shut-down, rather than shut-down the entire processing line containing the shut-down processing tool, work-pieces may be routed around the shut-down processing tool by transferring the work-pieces to an adjacent processing line within the FAB at an interchange node. The plurality of work-pieces may be transferred to other processing lines or streams through buffer or stocker stations. A buffer station may permit transfer between adjacent processing lines or streams while a stocker station may permit transfer between non-adjacent processing lines or streams. The buffer stations may additionally used to store work-pieces while waiting to be disposed into the next processing tool. At a location after the shut-down processing tool, the work-pieces may be transferred back to the processing line containing the shut-down processing tool through buffer or stocker stations. After the processing within the processing line or stream is completed, the work-pieces may be transferred from an array arrangement back to a stack arrangement. During the time period that the processing tool is shut-down, the other processing lines within the FAB may increase their throughput in order to maintain a substantially constant optimum throughput for the FAB over a given period of time.

Figure 1A:
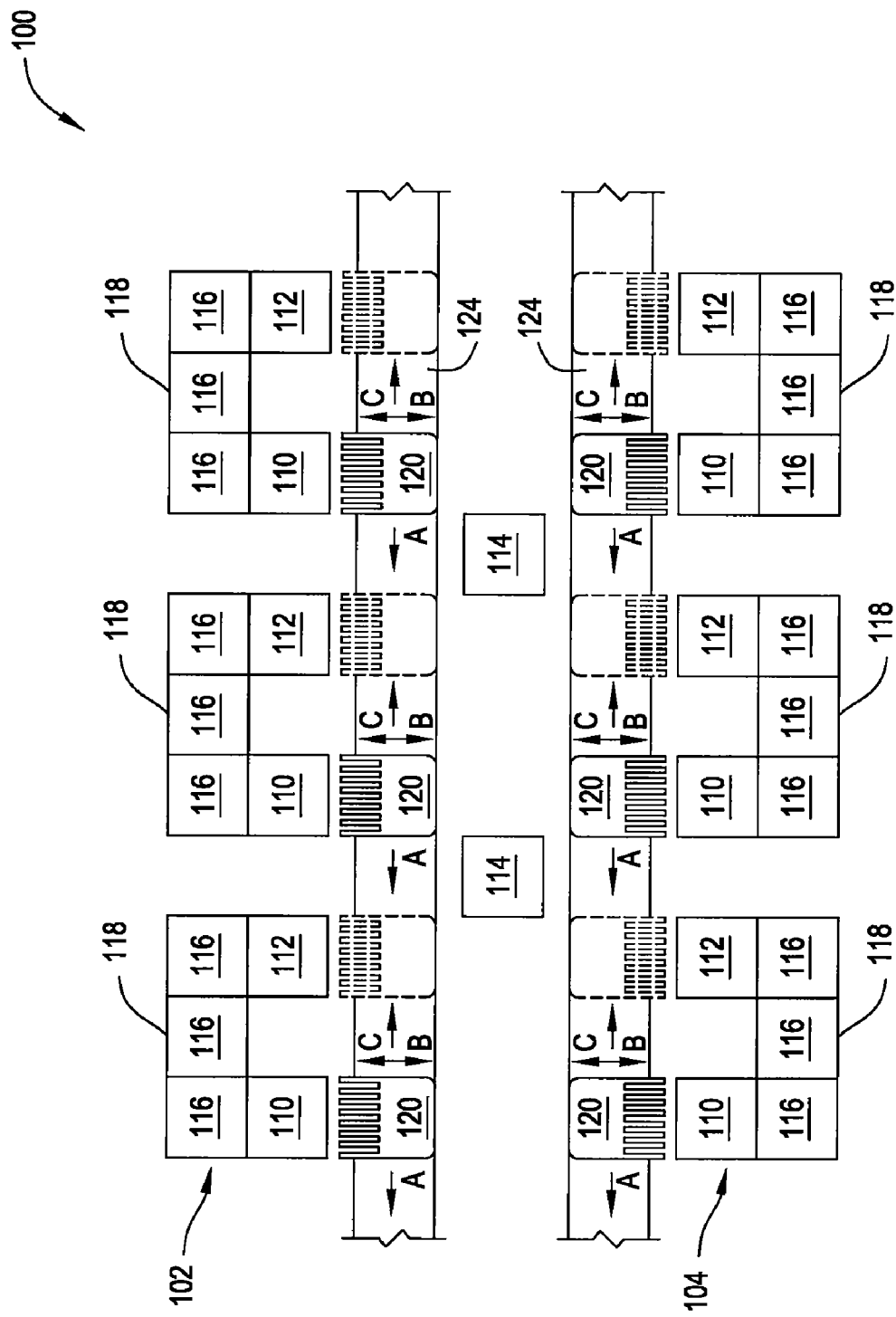
FIG. 1A is a schematic view of a FAB having a plurality of non-linearly arranged processing lines coupled together according to one embodiment of the invention.
Figure 1B:
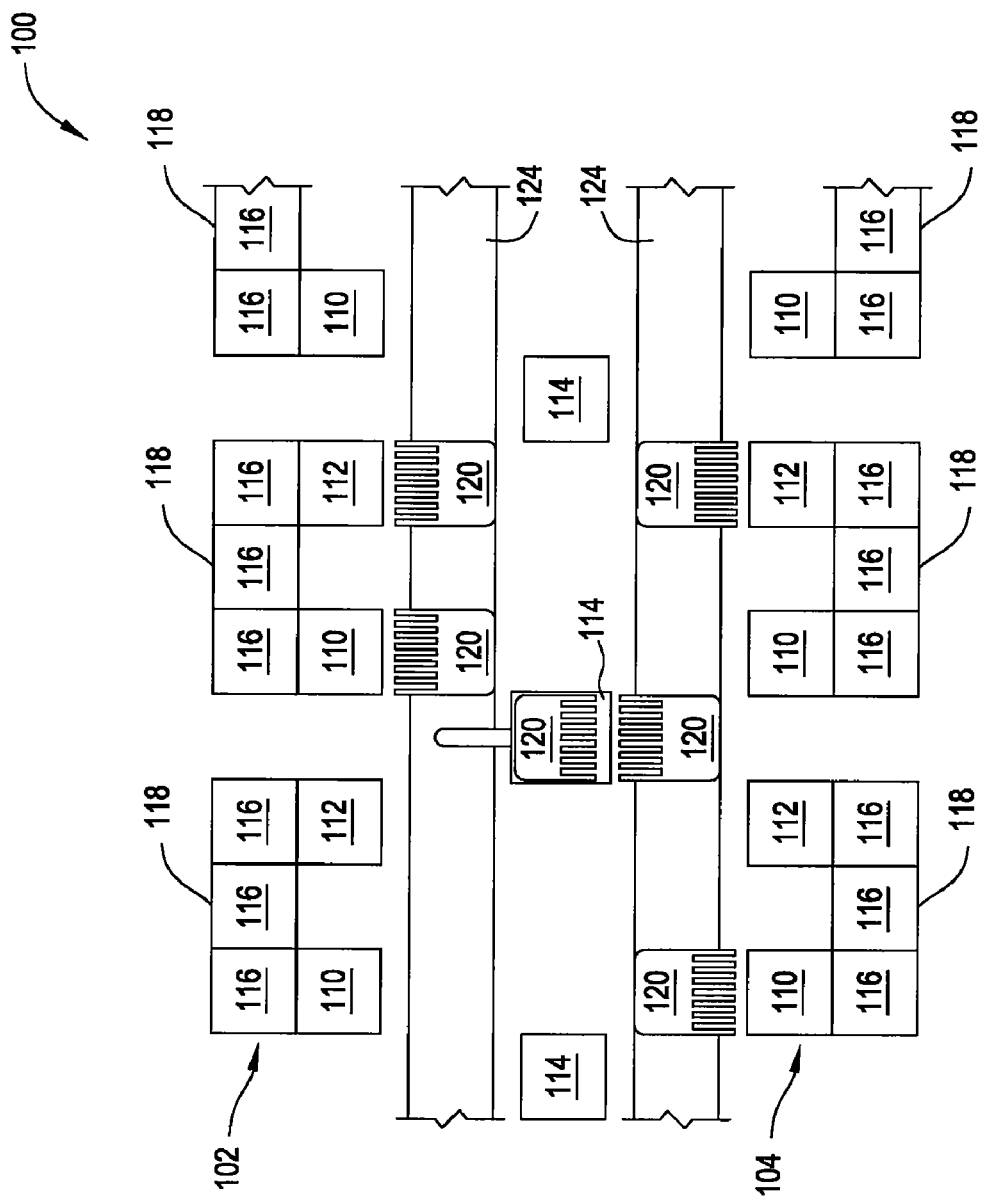
FIG. 1B is a schematic view of the FAB of FIG. 1A batch array transferring work-pieces between adjacent processing lines.

FIG. 1A is schematic view of a FAB 100 having a plurality of non-linearly arranged processing lines 102, 104 coupled together according to one embodiment of the invention. FIG. 1B is a schematic view of the FAB 100 of FIG. 1A batch array transferring work-pieces between adjacent processing lines

Figure 1C:
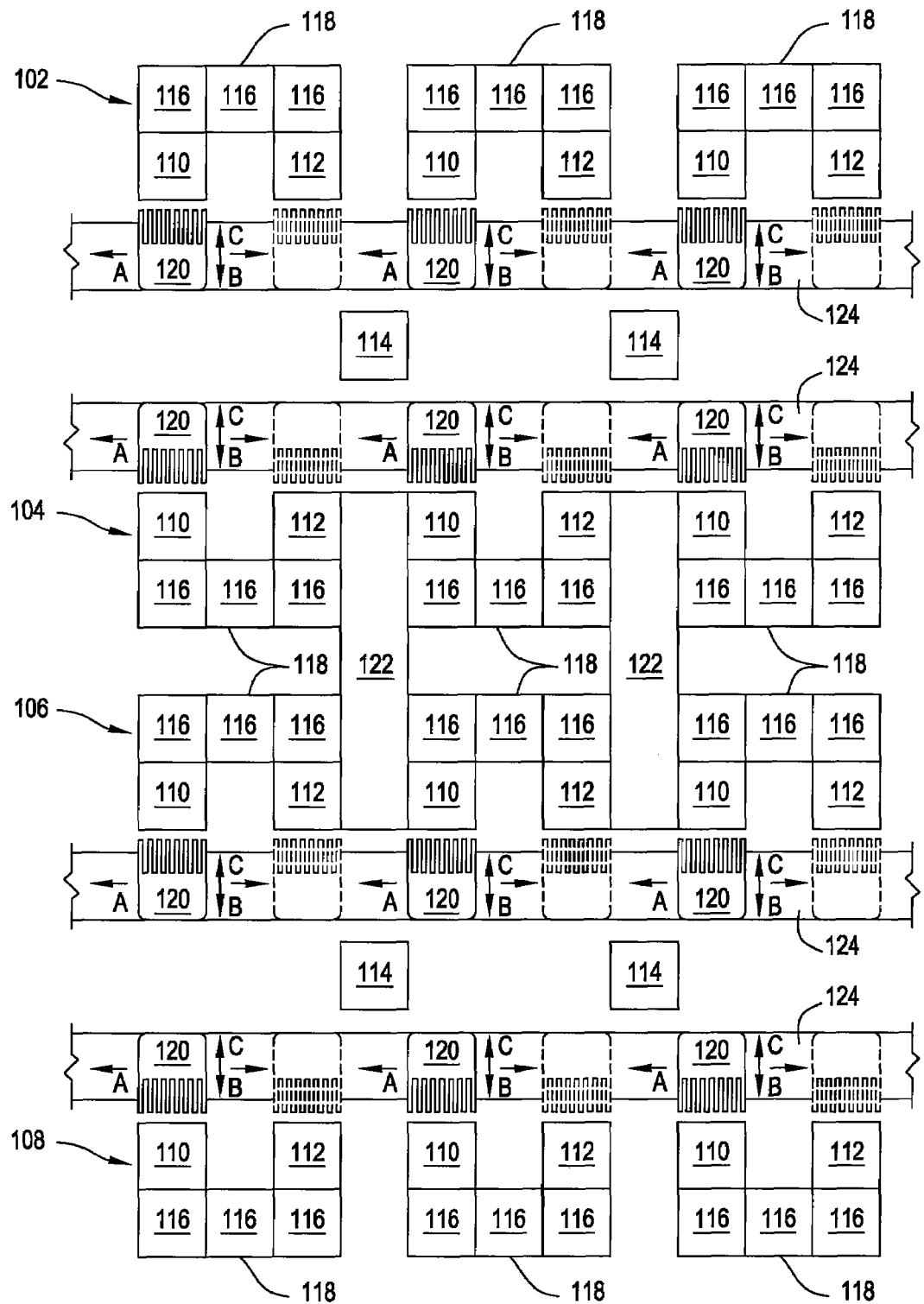
FIG. 1C is a schematic view of the FAB of FIG. 1A expanded to show four processing lines coupled together.

102, 104. FIG. 1C is a schematic view of the FAB 100 of FIG. 1A expanded to show four processing lines 102, 104, 106, 108 coupled together. As used throughout this application, the term array, sometimes referred to as a matrix, may be understood to encompass an arrangement of work-pieces in an n×m manner where n≧1 and m≧1 where at least one or n or m is greater than 1. An array is a set of photovoltaic work-pieces laid out in tabular form, often in rows, columns, or rows and columns. A batch array is a group of arrays. Batch array transferring refers to transferring a group of arrays.

Each processing line 102, 104, 106, 108 may comprise one or more processing tools 118 coupled together. The processing tools 118 may comprise one or more chambers 116. The processing tools 118 may be coupled together in the processing lines 102, 104, 106, 108 such that the optimum throughput of each processing line 102, 104, 106, 108 may be achieved at the minimum economic unit. The minimum economic unit means the greatest efficiency possible taking everything into account such as work-piece sequencing, processing time, transfer times, facility space, etc. The chambers 116 may comprise load lock chambers, preheat chambers, and processing chambers such as chemical vapor deposition (CVD) chambers, physical vapor deposition (PVD) chambers, cleaning chambers, etching chambers, inspection chambers, implantation chambers, etc.

Work-pieces may enter the processing tool 118 at an entrance position 110 and exit the processing tool 118 at an exit location 112. If necessary, the work-pieces may be temporarily stored at a buffer or stocker station 114. The buffer or stocker station 114 may be used to store the work-pieces between processing tools 118 whenever one processing tool 118 has a different processing time compared to the adjacent processing tool 118. It is to be understood that whenever one processing tool 118 has a longer processing time than an adjacent processing tool 118, the processing tool 118 may comprise a plurality of chambers 116 so that the faster processing tool 118 may have a minimum amount of down-time waiting for work-pieces.

For example, if one processing tool 118 takes two times as long as the adjacent processing tool 118, then by increasing the number of slow processing tools 118, the amount of work-pieces processed by the combined slow processing tools 118 is doubled and each slow processing tool 118 may process a batch of work-pieces. However, the faster processing tool 118 may then sequentially process a batch of work-pieces from each slow processing tool 118 such that when the faster processing tool 118 has completed both batches of work-pieces, two more batches of work-pieces are ready to be transferred from the slower processing tools 118. If only one slow processing tool 118 were present, then the faster processing tool would have a period of non-operation. Thus, by increasing the number of slow processing tools 118, the faster processing tool 118 may continuously run.

The processing tools 118 are not limited to the arrangement shown in FIGS. 1A-1C. For example, each processing tool 118 may comprise a cluster arrangement such as shown in U.S. Pat. No. 6,698,991 to Bachrach et al., which is incorporated by reference in its entirety.

When the work-pieces are transferred between processing tools 118 along a processing line 102, 104, 106, 108, the work-pieces may be extracted from the processing tool 118 at an exit location 112 by an end effector that may extend into the processing tool as shown by arrows C. An end effector may comprise a device at the end of a robotic arm, designed to interact with an environment. The exact nature of the end effector depends on the application of the robot. The end effector is, in essence, the "hand" connected to a robot's arm which may retain the photovoltaic work-pieces. The work-pieces may then be translated over to an adjacent processing tool 118 by moving the end effector 120 along a track 124 as shown by arrow B. The end effector 120 may then extend into a processing tool as shown by arrows C to insert the work-pieces into the adjacent processing tool 118.

One or more end effectors 120 may be disposed on a common track 124. Each end effector 120 may access one or more processing tool 118. In one embodiment, the end effectors 120 may translate as shown by arrows A, B along the track 124 to an adjacent processing tool 118 as shown by the end effectors 120 shown in shadow. More than one end effector 120 may access a processing tool 118 simultaneously as shown in FIG. 1B.

During normal operations, the FAB 100 may operate with the processing lines 102, 104, 106, 108 at a predetermined optimum throughput level for a predetermined period of time. The predetermined period of time may be an hour, a day, a week, a month, a year, etc. The predetermined optimum throughput level for the predetermined period of time may be equal to a value below the maximum throughput capacity for the FAB 100. Should one of the processing tools 118 within any processing line 102, 104, 106, 108 within the FAB 100 shut-down, the work-pieces may be transferred from one processing line 102, 104, 106, 108 to another processing line 102, 104, 106, 108.

Once work-pieces have been extracted from a processing tool 118 at an exit location 112, rather than translating the work-pieces over to an entrance position 110 of the adjacent processing tool 118 that is shut-down, the work-pieces may translate over to a buffer or stocker station 114 where the work-pieces may be translated over to an adjacent processing line 102, 104, 106, 108. FIG. 1B shows an end effector 120 extending into a buffer or stocker station 114 where it may be handed off to another end effector 120 or dropped off for later pick-up by another end effector 120. Additionally, the work-pieces may be translated up and over through a stocker station 122. An exemplary up and over stocker station 122 that may be used is disclosed in U.S. Pat. No. 5,957,648. As the processing lines 102, 104, 106, 108 are all substantially identical, the work-pieces may be transferred at a location corresponding to a processing tool 118 substantially identical to the shut-down processing tool 118. After processing, the work-pieces may then be transferred back to the processing line 102, 104, 106, 108 having the shut-down tool 118 at a location after the shut-down tool 118. Hence, the work-pieces may be routed around the shut-down tool 118.

Because the work-pieces are transferred to an adjacent processing line 102, 104, 106, 108, the throughput for the FAB 100 may decrease and thus, the throughput for the FAB 100 over a predetermined period of time may not meet the optimum throughput level. The predetermined period of time may be an hour, a day, a week, a month, or a year. To compensate for the decreased throughput, the throughput for the processing lines 102, 104, 106, 108 that do not have a shut-down processing tool 118 may increase their work-piece throughout to a level above their optimum operating capacity up to their maximum capacity. By increasing the throughput through the processing lines 102, 104, 106, 108 that do not have a shut-down processing tool 118, the processing lines 102, 104, 106, 108 may compensate for the shut-down processing tool 118. Once the shut-down processing tool 118 is back on line, then the work-pieces may be processed within the processing tool 118 and work-pieces may not be transferred between processing lines 102, 104, 106, 108. The throughput for each processing line 102, 104, 106, 108 may thus return to optimum throughput levels for the processing lines 102, 104, 106, 108 within the FAB 100 and thus, the average throughput for the predetermined period of time for the FAB 100 may remain substantially constant and a fault tolerance, or down-time compensation, is achieved. As throughput demands for the FAB 100 increase, additional processing lines 102, 104, 106, 108 may be added to achieve the optimum throughput and fault tolerance.

Figure 2:
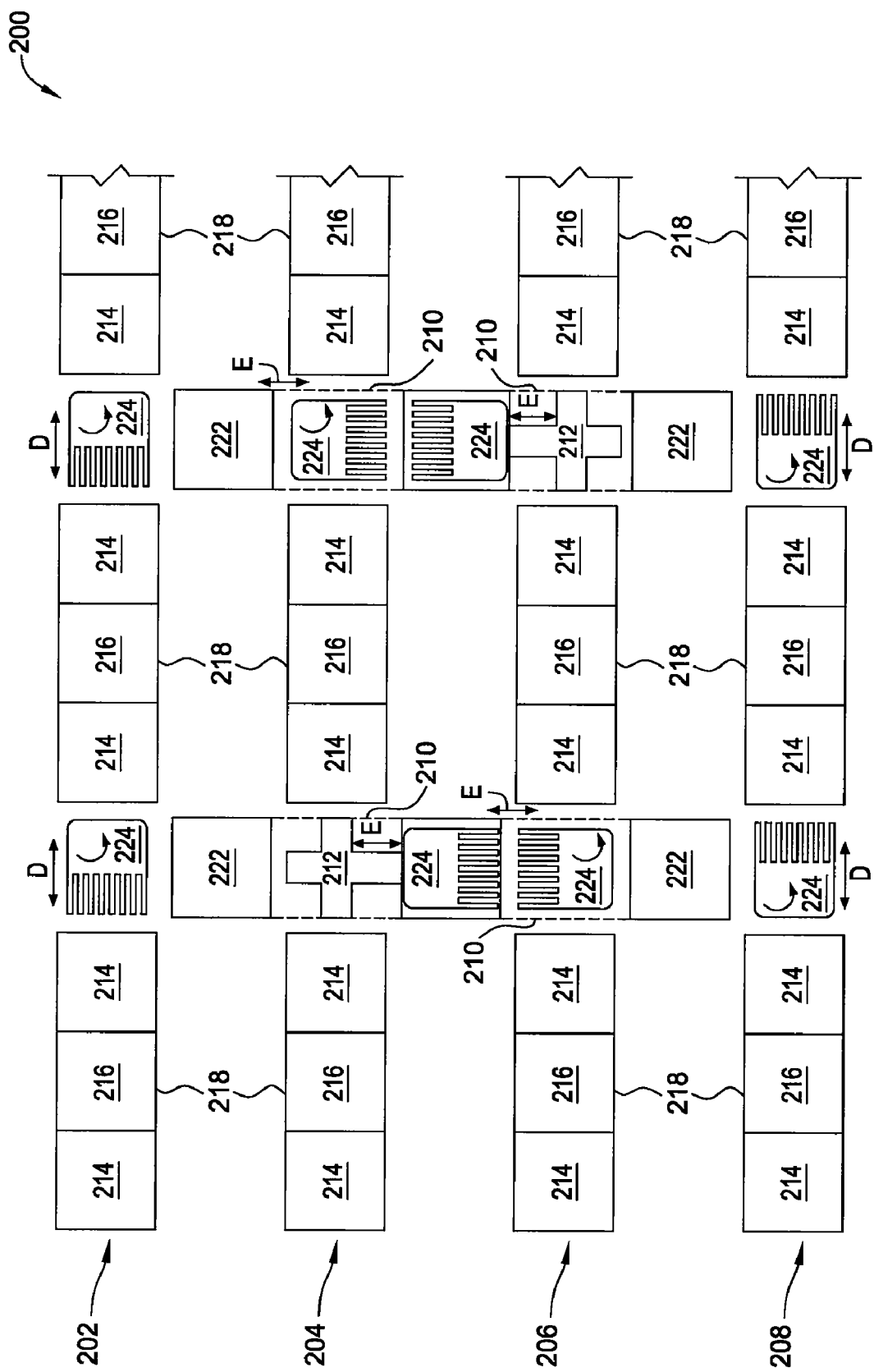
FIG. 2 is a schematic view of a FAB having a plurality of linearly arranged processing lines coupled together according to another embodiment of the invention.

FIG. 2 is a schematic view of a FAB 200 having a plurality of linearly arranged processing lines 202, 204, 206, 208 coupled together according to another embodiment of the invention. Similar to the embodiment discussed above, each processing line 202, 204, 206, 208 may comprise one or more processing tools 218. Each processing tool 218 may comprise one or more chambers 216. Load lock and unload lock chambers 214 may be coupled to the chambers 216. The chambers 216 may comprise preheat chambers, and processing chambers such as CVD chambers, PVD chambers, cleaning chambers, etching chambers, inspection chambers, implantation chambers, etc.

The work-pieces may be extracted from the load lock chambers 214 by an end effector 224 that may extend into the unload lock chamber 214 as shown by arrows D. The end effector 224 may then rotate and insert the work-pieces into a load lock chamber 214 on an adjacent processing tool 218 as shown by arrows D. Should the processing tool 218 be shut-down, the end effector 224 may extend as shown by arrows E along a track 212 into a buffer or stocker station 222 that transfers the work-pieces between processing lines 202, 204, 206, 208. A stocker station 210 may transfer the work-pieces to processing lines 202, 204, 206, 208 that are not adjacent by an up and over transfer as discussed above. The work-pieces may thus be routed around the shut-down processing tool 218. In a manner similar to that discussed above with respect to FIGS. 1A-1C, a fault tolerance may be achieved for the FAB 200.

It is to be understood that while FIGS. 1A-1C relate to a FAB 100 having a plurality of processing lines 102, 104, 106, 108 that have non-linearly arranged processing tools 118 and FIG. 2 relates to a FAB 200 having a plurality of processing lines 202, 204, 206, 208 that have linearly arranged processing tools 218, a FAB may have a mixture of linear and non-linear processing lines coupled together.

Figure 3A:
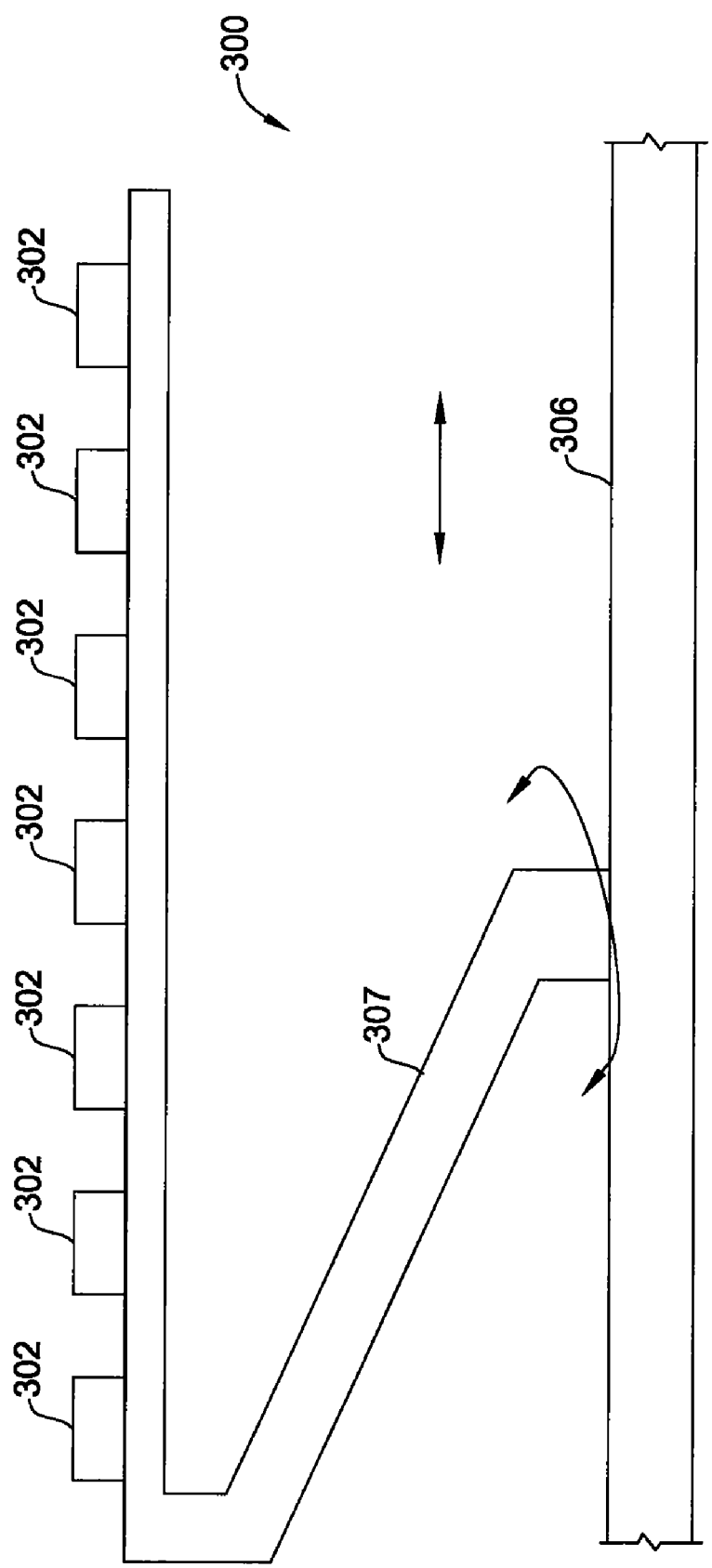
FIGS. 3A and 3B are side and top views of an array end effector according to one embodiment of the invention.
Figure 3B:
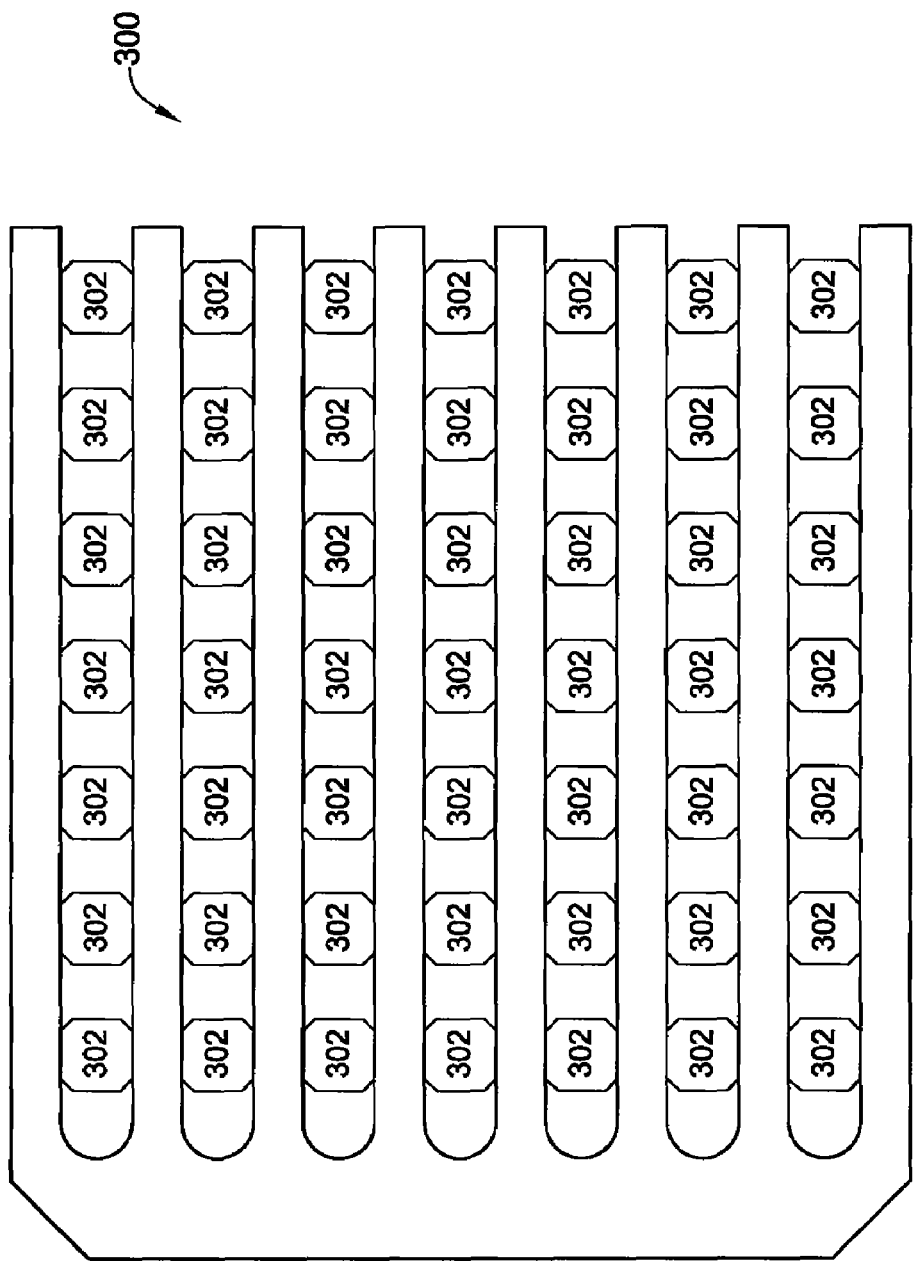

FIGS. 3A and 3B are side and top views of an array end effector 300 according to one embodiment of the invention. An array end effector is an end effector capable of retaining one or more arrays of photovoltaic work-pieces as opposed to a single work-piece. The array end effector 300 may extend into the processing tools shown in FIGS. 1A, 1B, 1C, and 2 and transfer the work-pieces 302 between processing tools and to buffer or stocker stations for transfer between processing lines. As shown in FIGS. 3A and 3B, the array end effector 300 may have a plurality of work-pieces 302 disposed thereon. The array end effector 300 may comprise a stem 304 for moving the array end effector 300 along a track 306 between chambers. The array end effector 300 may rotate and/or translate as shown by the arrows.

Figure 4A:
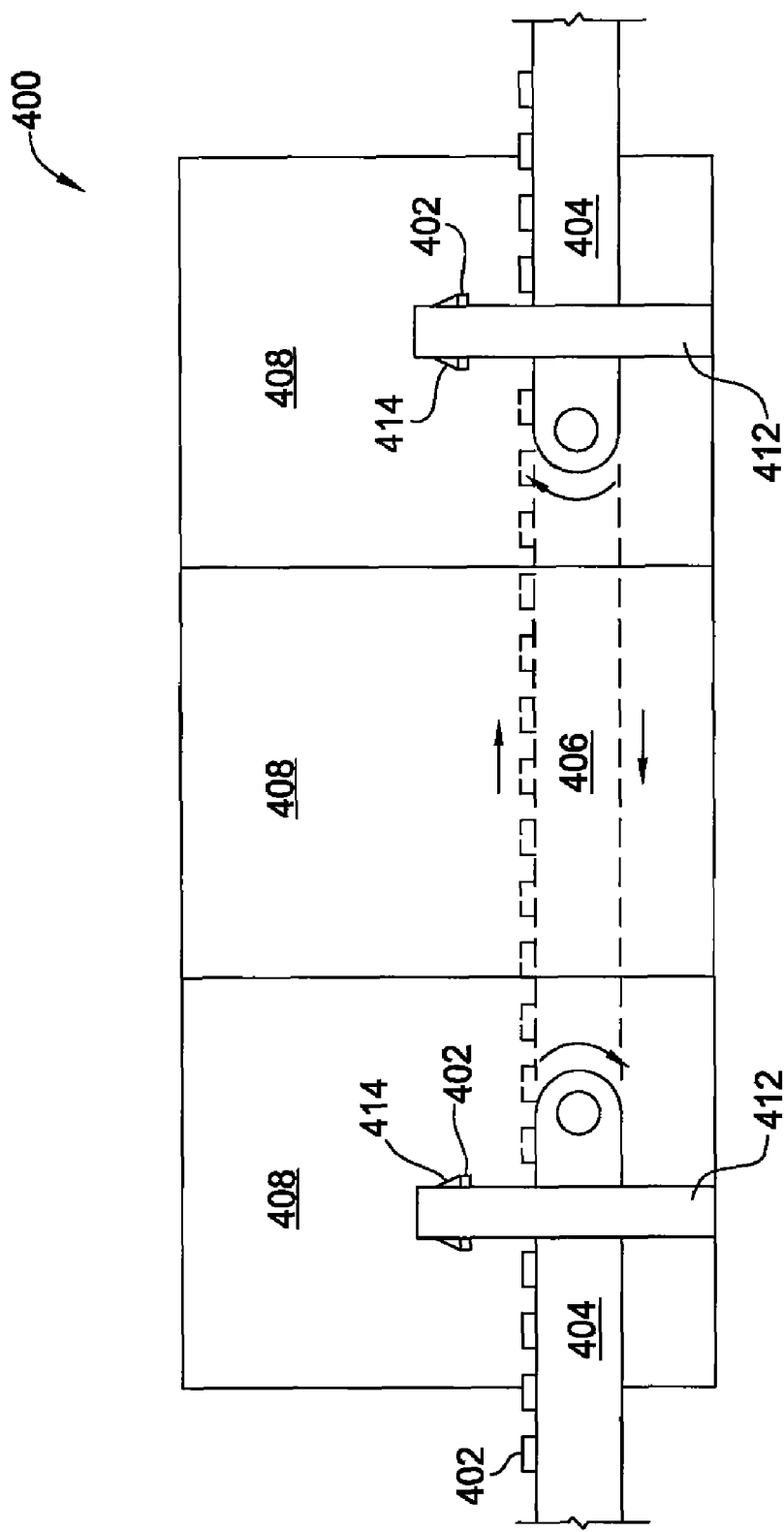
FIGS. 4A and 4B are schematic side and top views of a conveyor transfer system according to one embodiment of the invention.
Figure 4B:
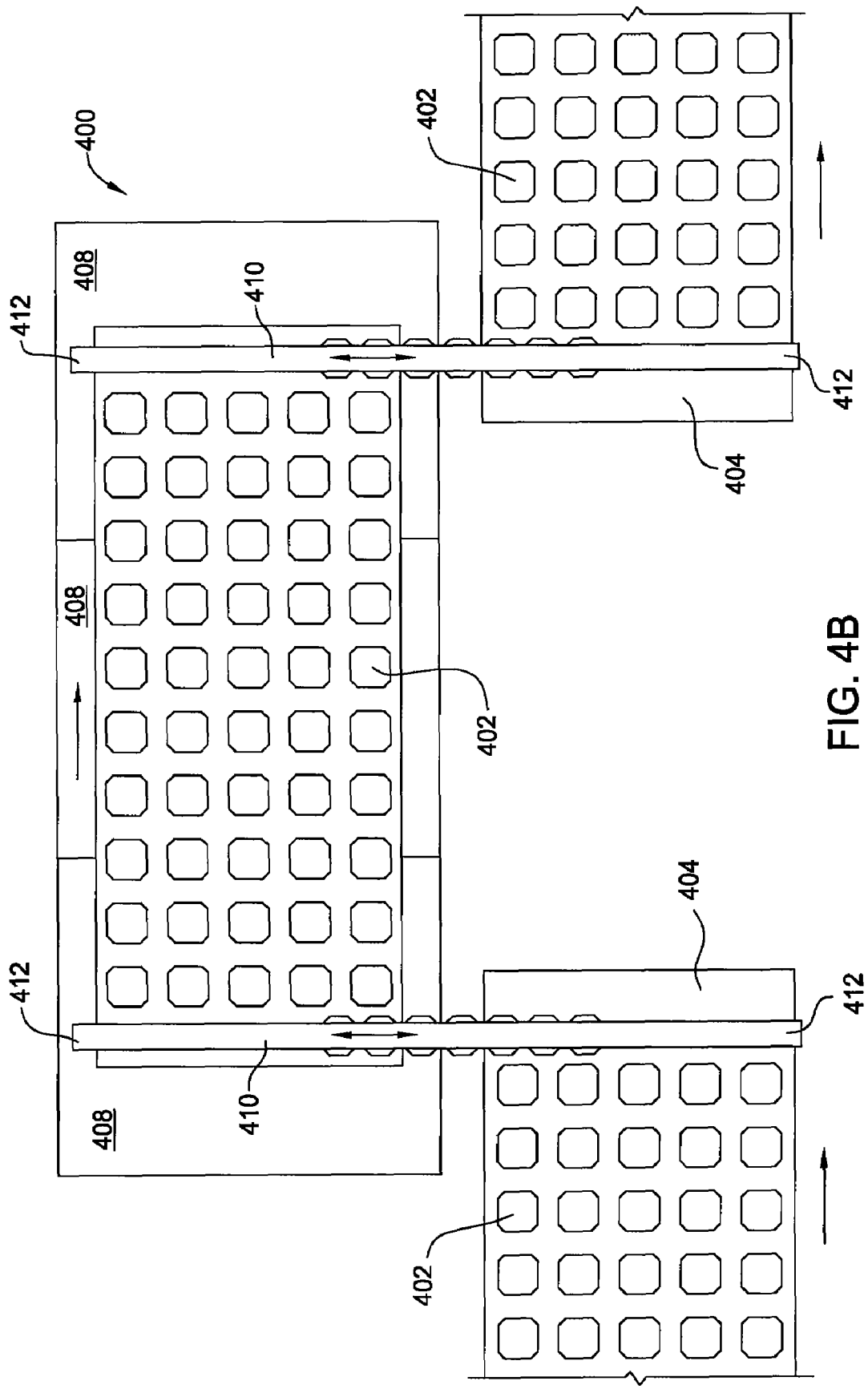

FIGS. 4A and 4B are schematic side and top views of a conveyor transfer system 400 according to one embodiment of the invention. The conveyor transfer system 400 may be used to transfer work-pieces from an array end effector to a processing tool or from an array end effector into a transfer chamber. The work-pieces 402 may be translated along the conveyor 404 to the chamber 408. A linear translator 410 supported by a post 412 may retrieve a line array of work-pieces 402 from the conveyor 404 by gripping the work-pieces with a gripper 414. The linear translator 410 may transfer the work-pieces from the conveyor 404 to a conveyor 406 within the chamber 408. At the end of the chamber 408, the work-pieces 402 may be removed from the conveyor 406 and transferred to a conveyor 404 by another linear translator 410. The chamber 408 may comprise a load lock chamber, a processing chamber, a buffer chamber, stocker station, a transfer chamber, or any other chamber that may be present along a processing line.

Figure 5:
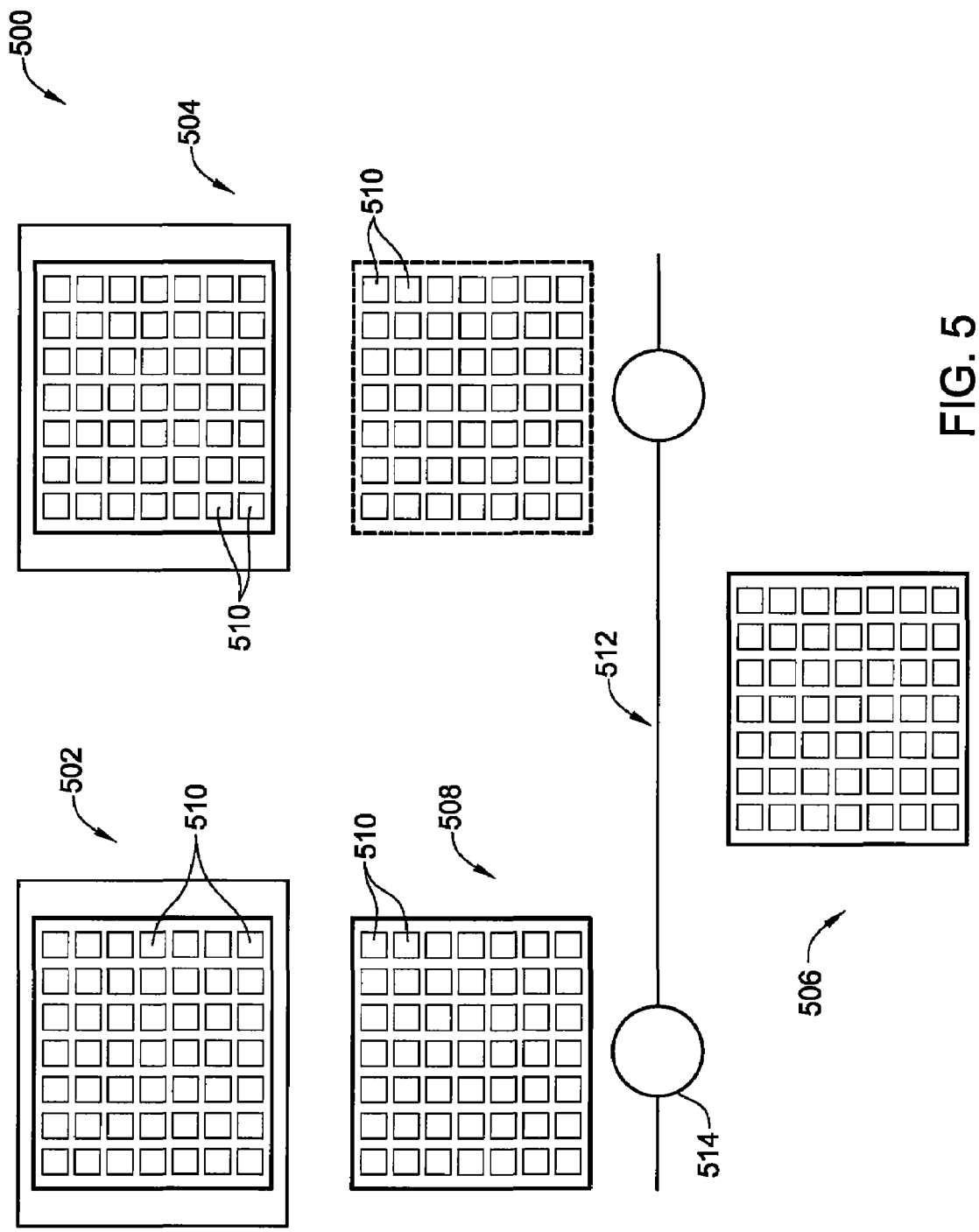
FIG. 5 is a schematic view of an extract-translate-insert work-piece transfer system according to one embodiment of the invention.

FIG. 5 is a schematic view of an extract-translate-insert work-piece transfer system 500 according to one embodiment of the invention. An array end effector 508 may extend into a processing tool 502 to retrieve a plurality of work-pieces 510. The array end effector 508 may then retract from the processing tool 502 and then translate along a track 512 to another processing tool 504 where the array end effector 508 may extend into the processing tool 504 to insert the work-pieces 510. Alternatively, should the processing tool 504 be shut-down, the array end effector 508 may stop on the track 512 and rotate about its rotation axis 514 and dispose the work-pieces into another chamber 506. The chamber 506 may comprise a buffer chamber to store work-pieces 510 under further processing or a transfer chamber to transfer the work-pieces from one processing line to another processing line.

Figure 6:
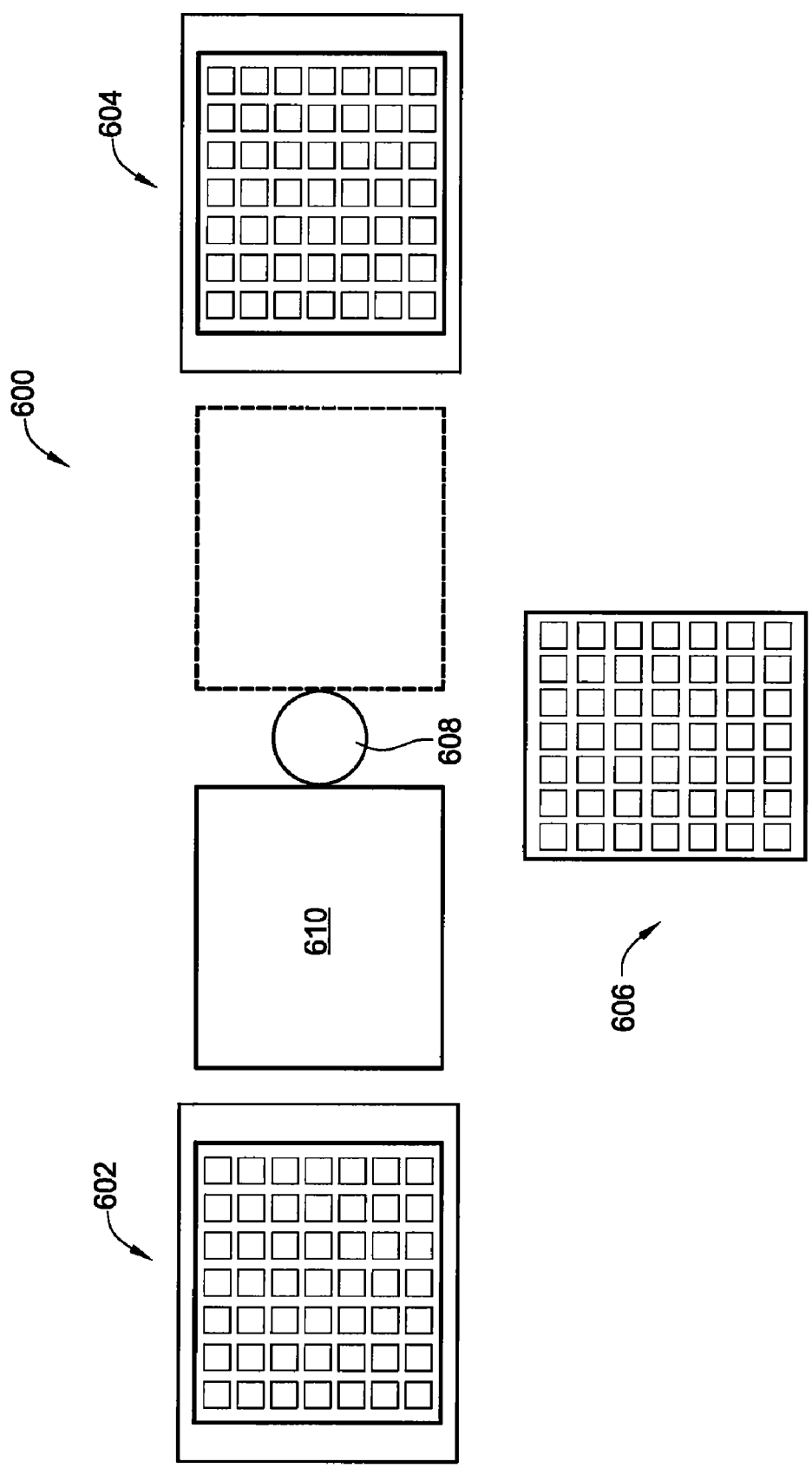
FIG. 6 is a schematic view of an extract-rotate-insert work-piece transfer system according to one embodiment of the invention.

FIG. 6 is a schematic view of an extract-rotate-insert work-piece transfer system 600 according to one embodiment of the invention. An array end effector 610 may extend into a processing tool 602, retract from the processing tool 602, rotate about its rotational axis 608, and extend into another processing tool 604 to dispose work-pieces into the processing tool 604. Should processing tool 604 be shut-down, the array end effector 610 may rotate about its rotational axis 608 and dispose the work-pieces into a chamber 606. The chamber 606 may be a buffer station for storing work-pieces until further processing or transferring between adjacent processing lines, or a stocker station for transferring work-pieces between non-adjacent processing lines.

Figure 7:
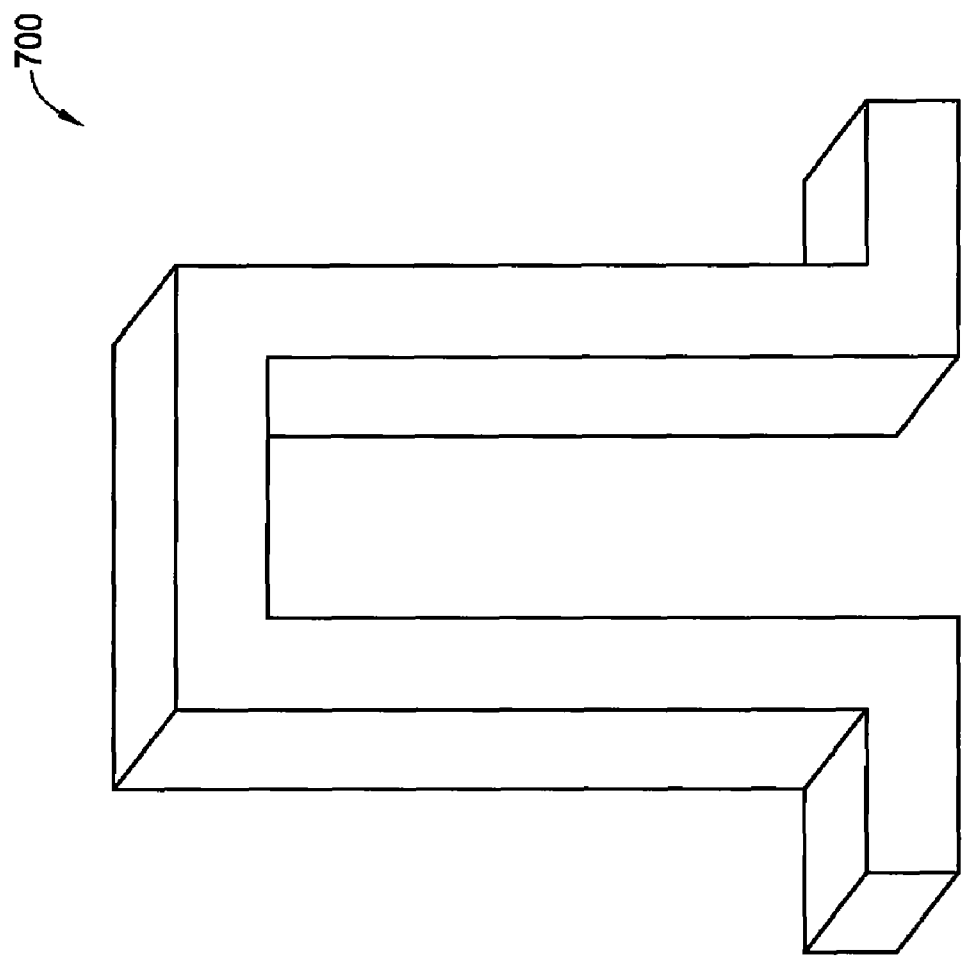
FIG. 7 is a schematic view of an up and over arrangement for transferring work-pieces between adjacent processing lines according to one embodiment of the invention. Depicted is an array to channel serial method.

FIG. 7 is a schematic view of an up and over arrangement 700 for transferring work-pieces between processing lines according to one embodiment of the invention. An exemplary up and over arrangement 700 that may be used is disclosed in U.S. Pat. No. 5,957,648. The arrangement 700 permits work-pieces to be moved between adjacent and non-adjacent processing lines. The work-pieces may be moved linearly, then vertically, then linearly, then vertically, and then linearly again to transfer the work-pieces. The up and over arrangement 700 permits technicians to walk through the FAB without walking over the transfer chambers. The arrangement 700 permits transfer of work-pieces from a first processing line to a second processing line that is not adjacent to the first processing line without interfering with the operation or throughput of a third processing line adjacent to the first processing line.

By transferring work-pieces between processing lines within a FAB during a shut-down of a processing tool, the average throughput over a predetermined period of time for a FAB may be maintained. The transferring of work-pieces permits a FAB to achieve a fault tolerance and thus, maintain a substantially constant throughput over the predetermined period of time.

While the foregoing is directed to embodiments of the present invention, other and further embodiments of the invention may be devised without departing from the basic scope thereof, and the scope thereof is determined by the claims that follow.

The invention claimed is:

1. A method of achieving fault tolerance for a photovoltaic factory, comprising:

disposing a plurality of work-pieces into a factory, the factory comprising a plurality of substantially identical processing lines, each processing line having a plurality of processing tools coupled together, the factory further comprising one or more buffer or stocker stations between each processing line at a location adjacent to each processing tool;

processing the work-pieces within the individual processing lines without transferring the work-pieces between the processing lines, the processing occurring at a predetermined optimum throughput that is below a maximum throughput;

detecting a shut-down at one or more processing tools in a first processing line of the plurality of substantially identical processing lines;

transferring the work-pieces from the first processing line to other processing lines at the one or more buffer or stocker stations at a location before the shut-down tool of the first processing line;

receiving transferred work-pieces from the first processing line into the other processing lines; and increasing throughput for the other processing lines to a level above the optimum level in order to achieve fault tolerance and maintain a substantially constant throughput averaged over a predetermined period of time.

2. The method of claim 1, wherein the plurality of processing tools within each processing line of the plurality of processing lines are arranged linearly such that the work-pieces move through the processing lines along a substantially linear path.

3. The method of claim 1, wherein the plurality of processing tools within each processing line of the plurality of processing lines are arranged non-linearly such that the work-pieces move through the processing lines along a substantially non-linear path.

4. The method of claim 1, wherein the plurality of processing lines are arranged within the factory such that at least one processing line comprises a plurality of processing tools arranged linearly such that the work-pieces move through the processing lines along a substantially linear path and at least one processing line comprises a plurality of processing tools arranged non-linearly such that the work-pieces move through the processing lines along a substantially non-linear path.

5. The method of claim 4, further comprising:
repairing the shut-down tool; and
operating the plurality of processing lines without transferring the work-pieces.

6. The method of claim 1, further comprising:
repairing the shut-down tool; and
operating the plurality of processing lines without transferring the work-pieces.

7. A method of achieving fault tolerance for a photovoltaic factory, comprising:
determining a minimum economic unit for a processing line within the factory to achieve an optimum throughout in the factory, the processing line having a plurality of processing tools coupled together;
coupling a plurality of processing lines together within the factory, each processing line having the minimum economic unit, the plurality of processing lines coupled together at one or more of the processing tools;
detecting a shut-down of one or more tools within one or more processing lines; and
compensating for the shut-down of the one or more tools to achieve fault tolerance, the compensating comprising:
transferring work-pieces between the plurality of processing lines at a first buffer or stocker station disposed prior to the shut-down of the one or more tools adjacent processing lines;
transferring the work-pieces between the plurality of processing lines at a second buffer or stocker station disposed after the shut-down of the one or more tools; and
increasing throughput through the plurality of processing lines above the optimum throughput such that the average throughput for the factory over a predetermined period of time remains substantially constant.

8. The method of claim 7, further comprising:
repairing the shut-down tool; and
operating the plurality of processing lines without transferring the work-pieces.

9. The method of claim 7, wherein the plurality of processing tools within each processing line of the plurality of processing lines are arranged linearly such that the work-pieces move through the processing lines along a substantially linear path.

10. The method of claim 7, wherein the plurality of processing tools within each processing line of the plurality of processing lines are arranged non-linearly such that the work-pieces move through the processing lines along a substantially non-linear path.

11. The method of claim 7, wherein the plurality of processing lines are arranged within the factory such that at least one processing line comprises a plurality of processing tools arranged linearly such that the work-pieces move through the processing lines along a substantially linear path and at least one processing line comprises a plurality of processing tools arranged non-linearly such that the work-pieces move through the processing lines along a substantially non-linear path.

12. The method of claim 11, further comprising:
repairing the shut-down tool; and
operating the plurality of processing lines without transferring the work-pieces.

13. A photovoltaic factory having fault tolerance capabilities, comprising:
a plurality of substantially identical processing lines disposed within the factory, each processing line comprising a plurality of processing tools that collectively produce photovoltaic devices;
one or more buffer or stocker stations disposed between adjacent processing lines at locations between each processing tool, the one or more stocker stations permitting transferring therethrough of photovoltaic work-pieces between processing lines; and
one or more work-piece transfer devices, the devices capable of retrieving a work-piece into a processing tool, and rotating and extending to the one or more buffer or stocker stations disposed between processing lines to transfer a work-piece between processing lines and achieve fault tolerance.

14. The factory of claim 13, wherein the one or more work-piece transfer devices are capable of linearly actuating to access an adjacent processing tool along the same processing line.

15. The factory of claim 13, wherein the plurality of processing tools within each processing line of the plurality of processing lines are arranged linearly such that work-pieces move through the processing lines along a substantially linear path.

16. The factory of claim 13, wherein the plurality of processing tools within each processing line of the plurality of processing lines are arranged non-linearly such that work-pieces move through the processing lines along a substantially non-linear path.

17. The factory of claim 13, wherein the plurality of processing lines are arranged within the factory such that at least one processing line comprises a plurality of processing tools arranged linearly such that work-pieces move through the processing lines along a substantially linear path and at least one processing line comprises a plurality of processing tools arranged non-linearly such that work-pieces move through the processing lines along a substantially non-linear path.

18. The factory of claim 13, wherein the one or more work-piece transfer devices further comprise a plurality of work-piece transfer devices, and wherein a plurality of work-piece transfer devices may access a common processing tool simultaneously.

19. The factory of claim 13, wherein the one or more buffer or stocker stations comprises one or more up and over stations.

20. The factory of claim 19, wherein the plurality of processing tools within each processing line of the plurality of processing lines are arranged non-linearly such that work-pieces move through the processing lines along a substantially non-linear path.

* * * * *